(12) United States Patent
Fischer (10) Patent No.: US 8,150,411 B2
(45) Date of Patent: Apr. 3, 2012

(54) METHOD FOR EFFICIENT RADIO RESOURCE MANAGEMENT

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 982 days.

(21) Appl. No.: 12/065,272

(22) PCT Filed: Aug. 28, 2006

(86) PCT No.: PCT/KR2006/003387
§ 371 (c)(1),
(2), (4) Date: Feb. 28, 2008

(87) PCT Pub. No.: WO2007/027032
PCT Pub. Date: Mar. 8, 2007

(65) Prior Publication Data
US 2008/0220792 A1 Sep. 11, 2008

(30) Foreign Application Priority Data
Aug. 30, 2005 (EP) .................................... 05291804

(51) Int. Cl.
*H04W 72/00* (2009.01)
(52) U.S. Cl. ...... 455/452.2; 455/68; 455/69; 455/232.1; 455/450; 455/515; 370/229; 370/230; 370/231; 370/232; 370/235; 370/395.2
(58) Field of Classification Search ............... 455/452.2, 455/68, 69, 232.1, 450, 452.1, 515; 370/229, 370/230, 231, 232, 235, 395.2
See application file for complete search history.

(56) References Cited

U.S. PATENT DOCUMENTS

| 5,870,675 | A | * | 2/1999 | Tuutijarvi et al. ............ 455/436 |
| 6,397,061 | B1 | | 5/2002 | Jordan et al. |
| 6,487,170 | B1 | * | 11/2002 | Chen et al. ..................... 370/231 |
| 6,519,461 | B1 | * | 2/2003 | Andersson et al. ............ 455/453 |
| 6,628,921 | B1 | * | 9/2003 | Vaddiparty et al. .......... 455/12.1 |
| 6,631,122 | B1 | * | 10/2003 | Arunachalam et al. ........ 370/332 |
| 6,801,501 | B1 | * | 10/2004 | Knightly et al. .............. 370/233 |

(Continued)

FOREIGN PATENT DOCUMENTS

DE 10008574 9/2001

(Continued)

OTHER PUBLICATIONS

Ericsson, "Clarification on ICS Version within UE Radio Access Capabilities," R2-020444, TSG-RAN Working Group 2, Meeting #27, Feb. 2002, XP-050120045.

*Primary Examiner* — Kamran Afshar
*Assistant Examiner* — Edward Zhang
(74) *Attorney, Agent, or Firm* — Lee, Hong, Degerman, Kang & Waimey (57) ABSTRACT

An improved admission control procedure for an admission control entity (e.g., Radio Network Controller (RNC), Node B, etc.) in a network that admits a terminal (mobile station, user equipment, etc.) having a certain receiver performance. Without improperly assuming one receiver performance or referring to a reference minimum receiver performance to calculate the resources that will be used, more accurate radio resources that should be used by the terminal when admitted to the cell can be determined by using appropriate information about the receiver performance of the terminal to be admitted.

13 Claims, 5 Drawing Sheets

U.S. PATENT DOCUMENTS

| | | | |
|---|---|---|---|
| 7,006,828 B1 * | 2/2006 | Czaja et al. | 455/442 |
| 7,024,202 B2 * | 4/2006 | Besset-Bathias et al. | 455/452.2 |
| 7,116,982 B2 * | 10/2006 | Balachandran et al. | 455/452.2 |
| 7,164,916 B1 * | 1/2007 | Ahnlund et al. | 455/437 |
| 7,206,587 B2 * | 4/2007 | Miyoshi et al. | 455/452.2 |
| 7,209,711 B2 * | 4/2007 | Terry et al. | 455/67.11 |
| 7,296,083 B2 * | 11/2007 | Barham et al. | 709/232 |
| RE40,056 E * | 2/2008 | Heath et al. | 375/267 |
| 7,460,834 B2 * | 12/2008 | Johnson et al. | 455/63.4 |
| 7,623,868 B2 * | 11/2009 | Judd et al. | 455/448 |
| 2002/0008672 A1 * | 1/2002 | Gothard et al. | 343/893 |
| 2002/0009999 A1 * | 1/2002 | Lee et al. | 455/454 |
| 2002/0102986 A1 | 8/2002 | Iwamura et al. | |
| 2002/0105940 A1 * | 8/2002 | Forssell et al. | 370/349 |
| 2004/0013089 A1 | 1/2004 | Taneja et al. | |
| 2004/0072571 A1 * | 4/2004 | Halonen et al. | 455/450 |
| 2004/0146092 A1 * | 7/2004 | Balakrishnan et al. | 375/147 |
| 2004/0203658 A1 | 10/2004 | Narayanan | |
| 2004/0203819 A1 | 10/2004 | Das et al. | |
| 2004/0203973 A1 * | 10/2004 | Khan | 455/517 |
| 2004/0242235 A1 * | 12/2004 | Witana | 455/452.2 |
| 2005/0026616 A1 * | 2/2005 | Cavalli et al. | 455/436 |
| 2005/0094596 A1 * | 5/2005 | Pietraski et al. | 370/329 |
| 2005/0193309 A1 * | 9/2005 | Grilli et al. | 714/752 |
| 2005/0233733 A1 * | 10/2005 | Roundtree et al. | 455/414.1 |
| 2006/0168336 A1 * | 7/2006 | Koyanagi et al. | 709/240 |
| 2006/0253464 A1 * | 11/2006 | Thilakawardana et al. | 707/100 |
| 2007/0248080 A1 * | 10/2007 | Nesargi et al. | 370/352 |
| 2008/0081635 A1 * | 4/2008 | Jonsson | 455/452.2 |
| 2008/0153505 A1 * | 6/2008 | Lindheimer et al. | 455/452.1 |
| 2008/0267136 A1 * | 10/2008 | Baker et al. | 370/336 |
| 2008/0287138 A1 * | 11/2008 | Yoon et al. | 455/452.2 |

FOREIGN PATENT DOCUMENTS

| | | |
|---|---|---|
| DE | 10306453 | 8/2004 |
| EP | 1058408 A1 * | 12/2000 |
| JP | 9-509546 | 9/1997 |
| JP | 2002232930 | 8/2002 |
| JP | 2003051773 | 2/2003 |
| JP | 2003513588 | 4/2003 |
| JP | 2003196200 | 7/2003 |
| JP | 2004159017 | 6/2004 |
| JP | 2005517369 | 6/2005 |
| JP | 2005191745 | 7/2005 |
| RU | 2199181 | 2/2003 |
| RU | 2216103 | 11/2003 |
| TW | 408893 | 10/2000 |
| TW | I223966 | 11/2004 |
| TW | I236303 | 7/2005 |
| TW | I316344 | 10/2009 |
| WO | 98/00984 | 1/1998 |
| WO | WO 03055257 | 7/2003 |
| WO | 2004/102837 | 11/2004 |
| WO | 2005/034453 | 4/2005 |
| WO | 2005/079097 | 8/2005 |

* cited by examiner

METHOD FOR EFFICIENT RADIO RESOURCE MANAGEMENT

CROSS-REFERENCE TO RELATED APPLICATIONS

This application is the National Stage filing under 35U.S.C. 371 of International Application No. PCT/KR2006/003387, filed on Aug. 28, 2006, which claims the benefit of earlier filing date and right of priority to European Patent Application No. 05291804.2, filed on Aug. 30 2005.

TECHNICAL FIELD

The invention relates to a method for performing admission control procedures in a cellular network. The invention applies in particular to networks using Spread Spectrum Multiple Access (SSMA), such as Code Division Multiple Access (CDMA) used in Universal Mobile Telecommunication System (UMTS) networks. The admission control procedure aims at determining the resources of a cell that a user equipment (UE) is going to use when it starts transmission in order to determine whether the user equipment can be admitted or not on the cell. The admission control procedure allows managing of network resources in an efficient manner in order to satisfy Quality of Service (QoS) requirements of different traffic classes.

BACKGROUND ART

In networks based on Code Division Multiple Access (CDMA), several user equipments (UE) can share a same frequency band, by associating to each user equipment a unique code having specific properties. The distinction between the different user equipments is made by detecting the code used by each user equipment.

In such systems, the maximum data rate that can be transmitted is limited by available radio resources, such as the number of available codes and the available transmit power.

Other factors of limitation stem from transport resources in the terrestrial network.

Other limitations are due to the fact that the maximum data rate that can be received/transmitted by a user equipment is limited, or the processing capabilities in the user equipment (e.g. bandwidth, number of simultaneously received codes, etc.) are limited.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
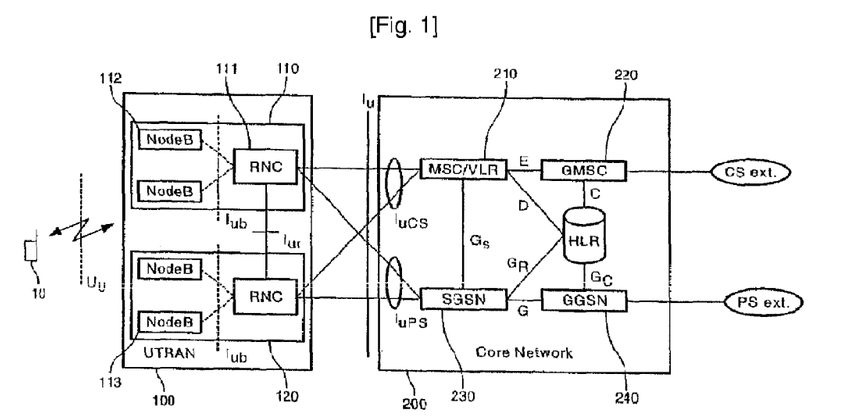
FIG. 1 is a block diagram of a general UMTS network architecture.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node (GGSN) 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as Iu-PS, and the Iu interface between the RNCs 111 and the core network 200 for circuit switched systems is defined as Iu-CS.

Figure 2:
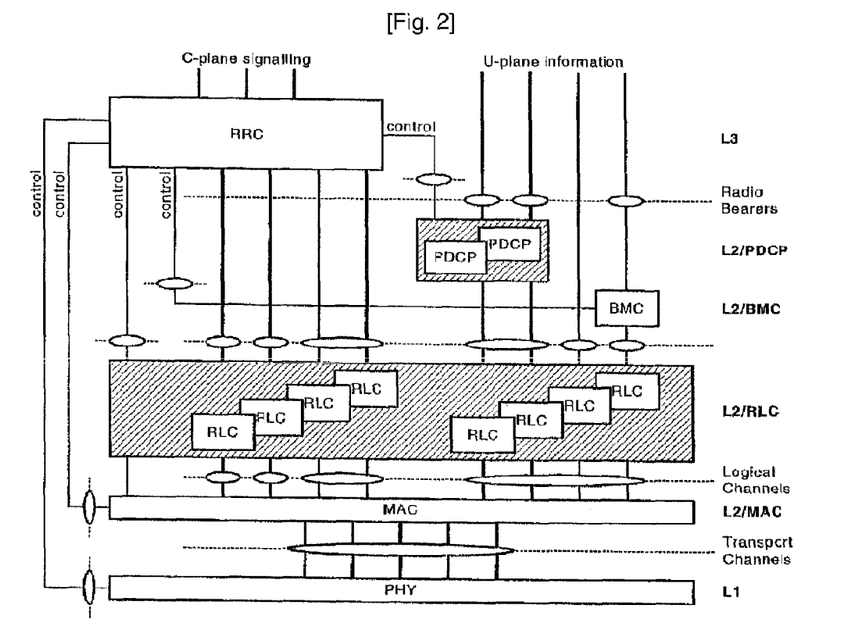
FIG. 2 is a block diagram of a structure of a radio interface protocol between a terminal and a network based on 3GPP radio access network standards.

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or MBMS service) refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

Figure 3:
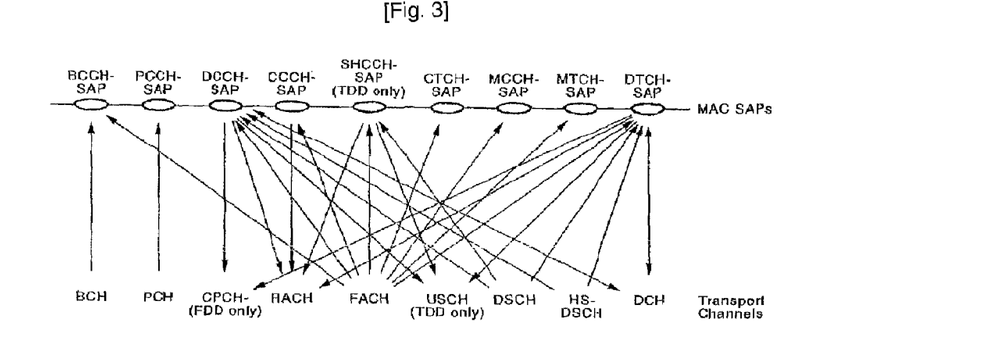
FIG. 3 illustrates the mapping of logical channels onto transport channels in the mobile terminal.
Figure 4:
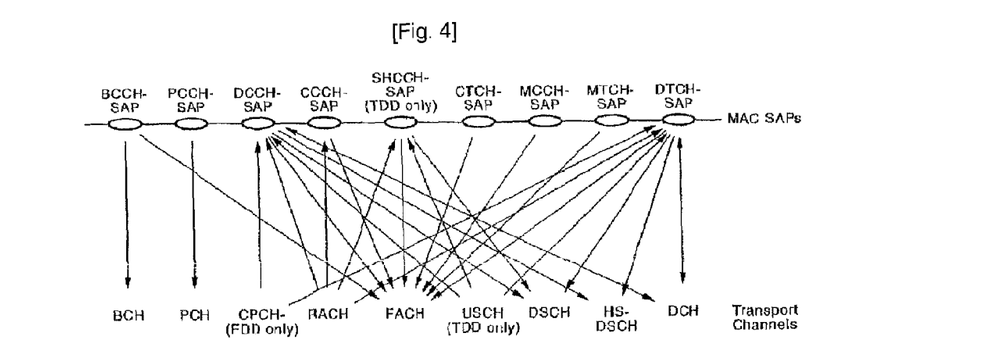
FIG. 4 illustrates the mapping of logical channels onto transport channels in the network.

The MAC-c/sh sub-layer manages a common transport channel, such as a forward access channel (FACH) or a downlink shared channel (DSCH), which is shared by a plurality of terminals, or in the uplink the Random Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sub-layer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUS) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a CB message, hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, namely, a function called header compression can be used.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

In UMTS systems, it is possible to include Quality of Service (QoS) attributes for a given Packet Data Protocol (PDP) context or Radio Access Bearer (RAB), based on a service profile. The service profiles include Quality of Service (QoS) for conversational traffic, streaming traffic, interactive traffic or background traffic. The service profiles comprise Quality of Service attributes, such as delay attributes, and guaranteed or maximal bit rate. Therefore it is necessary that the network in order to determine whether a given Quality of Service (QoS) can be provided, estimates the resources that will be used by a user equipment, and compares it to the resources that are actually available. This procedure is commonly called RAC (Radio Admission Control) or CAC (Call Admission Control), depending on whether this procedure is done at the beginning of a call, service or at establishment of a new flow, at transition to an active state or during a handoff.

The admission control procedure is triggered each time a link between a user equipment and a given cell must be established.

In UMTS networks, admission control procedure is performed by a Radio Network Controller (RNC). The Radio Network Controller (RNC) can estimate resources that are necessary on the basis of different data provided on one hand by the user equipment (UE) and on the other hand data provided by connected base stations (Node Bs) of the network.

The data provided to the Radio Network Controller by the user equipment can include a Received Energy per chip divided by the power density in the band (Fc/No), a Received Signal Code Power (RSCP), a Received Signal Strength Indicator (RSSI) and a pathloss measured by the user equipment on Common Pilot CHannel (CPICH) of the cell.

The data provided by a connected Node B can include Transmitted Carrier Power, Transmitted carrier power of all codes not used for High Speed Physical Downlink Shared CHannel (HS-PDSCH) or High Speed Shared Channel Control CHannel (HS-SCCH) transmission, High Speed Downlink Shared CHannel (HS-DSCH) Required Power or High Speed Downlink Shared CHannel (HS-DSCH) Provided Bit Rate.

Based on this information the Node B and the Radio Network Controller (RNC) calculate resources that would be necessary if the user equipment is granted access to the cell with the reserved capacity necessary and estimates whether or not it is possible to accept the new user link.

The threshold for accepting the new user link could be different depending on whether it is a new call, a new service or whether there is only a handover done, and could depend on many other factors or information, such as the resource availability in the cell of the call or in the neighbouring cells. Typically, dropping an ongoing call is considered as more critical than the impossibility to initiate a call and the need to delay it until the resources are available.

It is possible that different transmission techniques are used by the Node B that are not activated when the admission control for a new service is considered, due to the fact that for instance when the user equipment (UE) tries to access the cell, the network can not know which techniques the user equipment (UE) is able to apply. Examples for such types of techniques are transmission (Tx) diversity or more generally Multiple-Input-Multiple-Output (MIMO).

Similarly the user equipment (UE) can use different receiver techniques for different channels which would imply different receiver performances and thus resources used. Whether the user equipment (UE) uses or supports one receiver technique or another one could even be transparent to the network, for instance in case the user equipment (UE) uses two different receive antennas.

Moreover, depending on the different receiver/transmitter techniques, the resources used by the user equipment (UE) can vary quite drastically. In particular, user equipments can use different receiver techniques that require more or less cell power for a same data rate. For example, user equipments can have a rake receiver, a Linear Minimum Mean Square Error (LMMSE) receiver or other types of receivers.

Currently, the Radio Network Controller (RNC) or Node B is only informed on the receiver techniques the user equipment (UE) uses and supports that impact the transmission techniques used in the RNC or Node B.

DISCLOSURE OF INVENTION

Technical Problem

However, the Radio Network Controller (RNC) or Node B assumes one receiver performance to calculate the resources that will be used. For instance, the Radio Network Controller (RNC) or Node B assumes that the receiver performance of the user equipment is a reference minimum receiver performance.

Therefore, the resources calculated by the Radio Network Controller (RNC) or by the Node B can differ quite drastically from the actual resources that would actually be used by the user equipment in the event that the user equipment were admitted on the cell.

As a consequence, the related art admission control procedures do not provide optimal management of the network resources to user equipments.

Technical Solution

The present invention provides an improved admission control procedure for an admission control entity (e.g., Radio Network Controller (RNC), Node B, etc.) in a network that admits a terminal (mobile station, user equipment, etc.) having a certain receiver performance. Without improperly assuming one receiver performance or referring to a reference minimum receiver performance to calculate the resources that will be used, more accurate radio resources that should be used by the terminal when admitted to the cell can be determined by using appropriate information about the receiver performance of the terminal to be admitted.

BRIEF DESCRIPTION OF THE DRAWINGS

The invention will be described with reference to the drawings, in which.

MODE FOR THE INVENTION

One aspect of the present invention relates to the recognition by the present inventors about the problems of the related art as described above, and further explained hereafter.

In particular, radio admission control (i.e., admission control performed at connection setup) that determines whether a new terminal (UE) can be admitted (i.e., whether a new user link may be established) is especially important for certain types of more advanced or enhanced services, such as streaming, Voice over Internet Protocol (VoIP), and the like.

In the related art, although radio admission control is based upon some basic information provided by the terminal to the network (RNC), enhanced services may require the terminal to send some sort of indication (and/or additional information) to the network in order to allow the terminal to properly receive such enhanced services.

As the network (e.g., RNC, Node B, etc.) needs to handle numerous terminals that have different capabilities, the related art assumption of using only a single receiver performance (or using a reference minimum receiver performance) for the numerous terminals to calculate radio resources that will be used is clearly not optimal in view of more advanced networks that handle enhanced terminals with greater capabilities. Such related art assumption may be appropriate when the terminals being managed by the network have only minimal capabilities, such as low-end cell phones that only support basic voice communications. However, as enhanced terminals (e.g., 3G phones, PDAs, etc.) can support more advanced capabilities (e.g., video telephony, wireless access, etc.), the network needs to be informed from each terminal about its particular details of receiver performance.

Here, it is understood that receiver performance refers to the characteristics of the receiver in the terminal that are at least necessary for properly receiving communication (data, information, signals, etc.) from the network (e.g., RNC, Node B, etc.). As there are many types of terminals that are currently available, and because new terminals will continue to be developed, the performance of the receiver will vary depending upon the type of terminal. Namely, more advanced and typically more expensive terminals would generally have greater performance capabilities when compared to less advanced or less expensive terminals.

Accordingly, minimum receiver performance can refer to those basic characteristics that a receiver in a particular type of terminal requires in order to achieve a minimal level of performance in properly receiving signals and/or data.

Also, as network technology continues to develop, it is foreseen that RNCs may no longer be necessary in future networks, because Node Bs with enhanced capabilities, or other types of network entities e.g. so-called Access Gateways may handle the operations performed by currently existing RNCs. Such long-term evolution issues further support the need to develop improved radio admission control techniques to be used in admitting new terminals (or establishing new user links) and supporting newly developing enhanced services for a greater number of terminals being managed by the network.

Figure 5:
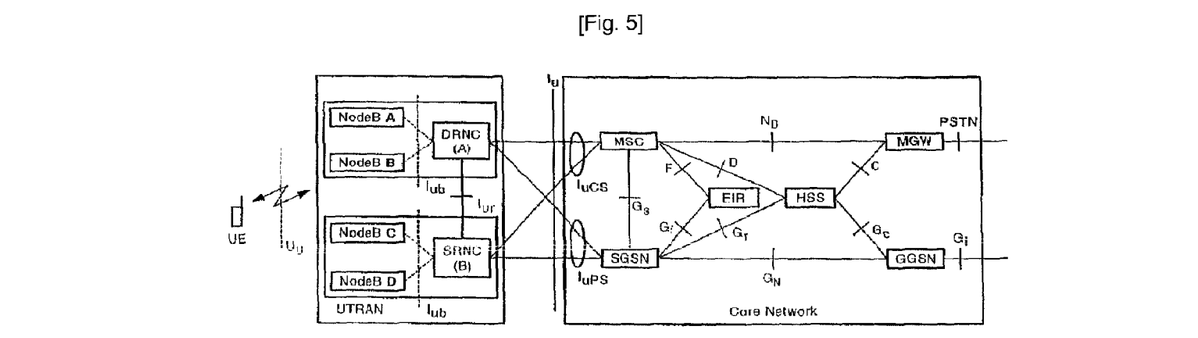
FIG. 5 shows a UMTS network and a user equipment.

In FIG. 5, a terminal (e.g., user equipment (UE)) is located in a cell of a UMTS network. The user equipment is a mobile station (e.g., cell phone, PDA, laptop, etc.) adapted for setting communications with the UMTS network in order to access services provided by the network.

The UMTS network may comprise a Universal Terrestrial radio Access Network (UTRAN) and a Core Network (CN).

The UTRAN may comprise a plurality of Nodes B and a plurality of Radio Network Controllers (RNC), The Nodes B may be base stations adapted for transmission and reception between the UTRAN and the user equipment. Each Node B controls one or several cells, where a cell is characterized by the fact that it covers a given geographical area on a given frequency.

Each Radio Network Controller (RNC) controls a plurality of Nodes B. The RNC can handle the assignment and management of radio resources and operates as an access point with respect to the Core Network (CN). Radio Network Controllers (RNC) may include Controlling Radio Network Controllers (CRNC), Serving Radio Network Controllers (SRNC) and Drift Radio Network Controllers (DRNC). As illustrated in FIG. 5, the CRNC and SRNC can be collocated (namely, the CRNC and SRNC may be located together within a single entity or may be separate entities).

The Core Network (CN) may comprise a Mobile Switching Center (MSC), an Equipment Identity Register (EIR), a Serving GPRS Support Node (SGSN), a Gateway GPRS Support Node (GGSN), a Home Subscriber Server (HSS) and a Media GateWay (MGW).

The Media GateWay (MGW) is connected to the Public Switched Telephone Network (PSTN).

Figure 7:
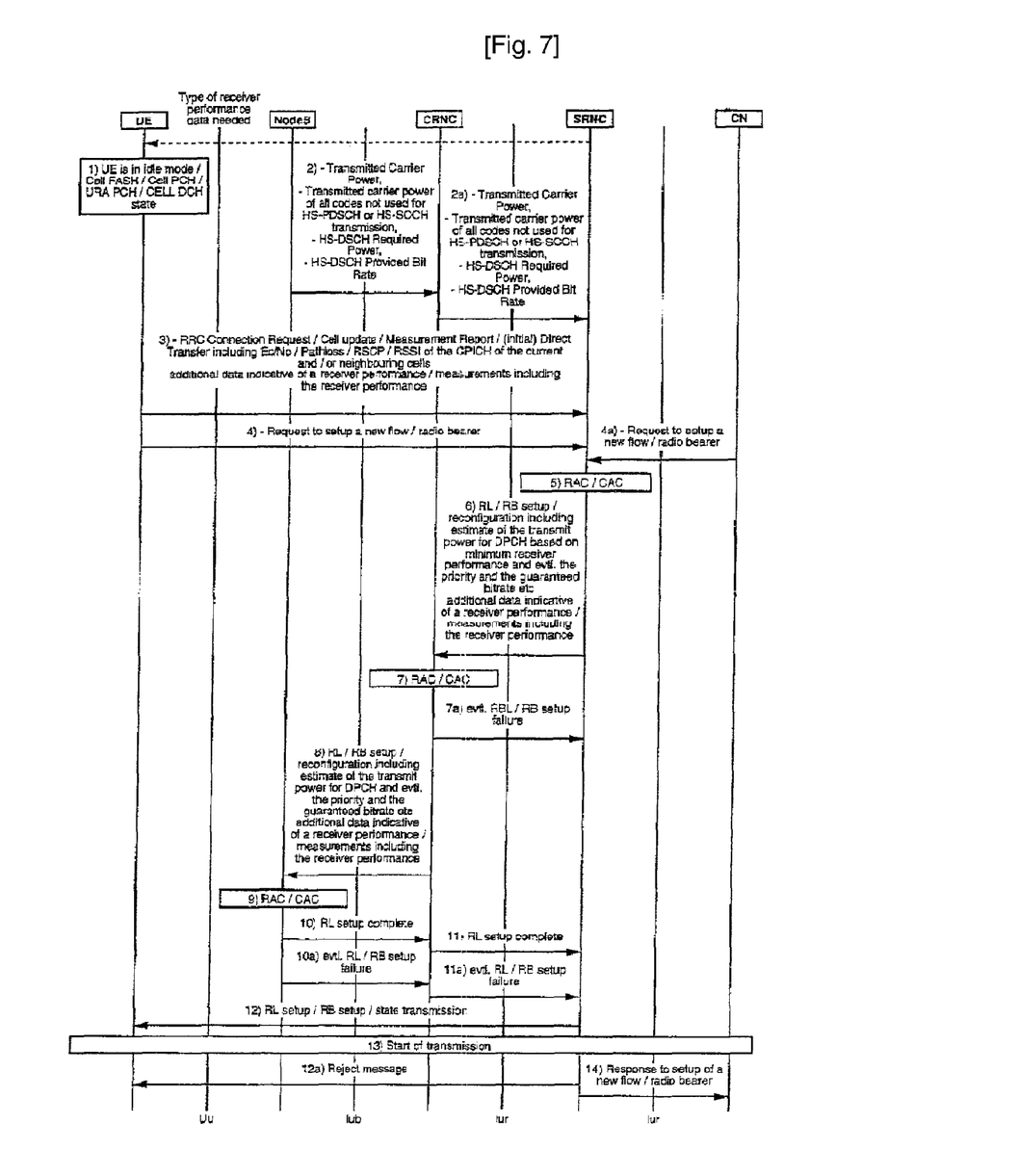
FIG. 7 is a diagram illustrating an admission control procedure according to an embodiment of the invention, in a UMTS network.

FIG. 7 is a diagram illustrating different steps of an admission control procedure.

Figure 6:
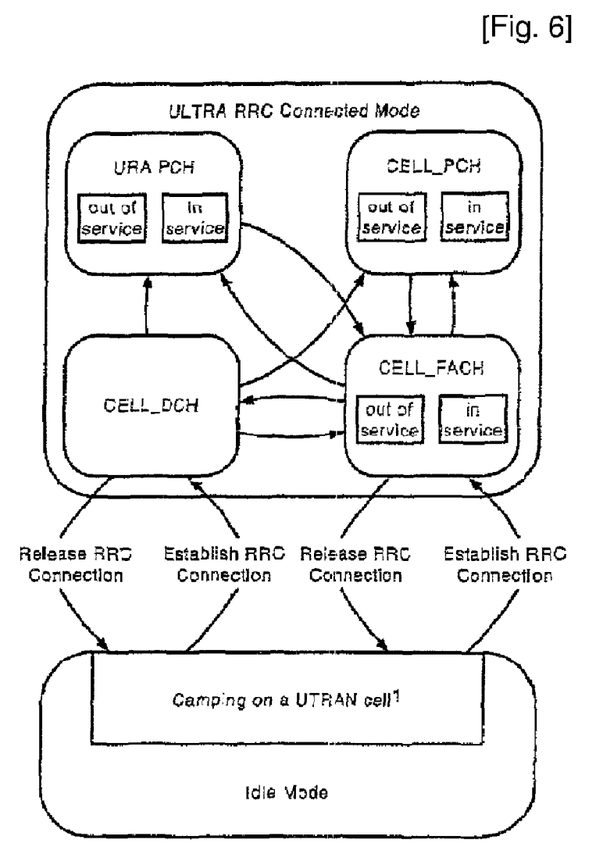
FIG. 6 shows possible state transitions of a user network.

According to a first step, the user equipment (UE) is initially located in a given cell and is in a given state. The possible transitions between modes and states are shown in FIG. 6. For instance, the user equipment is in an idle mode or in a connected mode.

If the user equipment is in an idle mode, there is no Radio Resource Control (RRC) connection between the user equipment and the UTRAN.

If the user equipment is in a connected mode, a Radio Resource Control (RRC) connection is established between the user equipment and the UTRAN. In the connected mode, the user equipment can be in different states.

The CELL_DCH state is characterized by the allocation of dedicated radio resources of the cell. The user equipment having a connection to the UTRAN listens to one or several dedicated transport channel(s) (DCH).

In CELL_FACH state, the user equipment listens to several common transport channels (RACH, FACH, CPCH).

In CELL_PCH state and URA_PCH state the user equipment listens to paging channels (PICH and PCH).

According to a second step, a Node B regularly transmits data relative to the resources used in the cell to the associated CRNC. Such data may include the following parameters: a Transmitted Carrier Power (TCP), Transmitted carrier power for all codes not used for High Speed Physical Downlink Shared CHannel (HS-PDSCH) or High Speed Shared Channel Control Channel (HS-SCCH) transmission, High Speed Downlink Shared CHannel (HS-DSCH) Required Power and High Speed Downlink Shared CHannel (HS-DSCH) Provided Bit Rate.

The CRNC forwards these parameters to the SRNC.

According to a third step, the user equipment (UE) may transmit a message to the SRNC for requesting a given service, the service requiring allocation of radio resources from the cell.

Allocation of radio resources is needed when, for instance, the user equipment is initially in an idle mode and requests to be admitted in the cell in order to set up a communication (Radio Link or Radio Bearer).

Allocation of radio resources is also needed in order to trigger a handover or a state transition.

Allocation of radio resources is also needed when the user equipment is already in a connected mode and needs to increase the data rate.

Together with the request message, the user equipment may transmit measured parameters indicative of a radio quality of the Common Pilot Channel (CPICH) of the current and neighbouring cells. These parameters include for instance a Received Energy per chip divided by the power density in the band (Ec/No), a Received Signal Code Power (RSCP), a Received Signal Strength Indicator (RSSI) or a pathloss, of the Common Pilot Channel (CPICH) of the current and neighbouring cells.

Alternatively, according to a fourth step, the user equipment or the Core Network (CN) can transmit a message to the SRNC requesting to set up a new flow or a new radio bearer.

Together with the request message, the user equipment may also transmit to the SRNC data indicative of a receiver performance of the user equipment (UF).

Alternatively the SRNC can use information on the receiver performance received already in an earlier admission control procedure, or received from another RNC in the case the SRNC has changed.

According to a first embodiment, the data indicative of the receiver performance include at least one of the following parameters:
  a Carrier Interference C/I required by the user equipment,
  a Received Energy per chip divided by the power density in a band of a pilot channel of the cell Ec/No required by the user equipment,
  a Received Energy per bit divided by the power density in a band of a pilot channel of the cell Eb/No required by the user equipment,
said parameters being defined for predetermined Bit Error Rate (BER)/Block Error Rate (BLER), number of bits per Transmission Time Interval (TTI) or data rate.

According to a second embodiment, the data indicative of the receiver performance include a receiver category, said category defining a given receiver performance.

According to this second embodiment, user equipments are classified in several predefined categories, each category defining a given range of receiver performance.

For instance, each category can be defined as a range of Carrier Interference C/I for predetermined Bit Error Rate (BER)/Block Error Rate (BLER), number of bits per Transmission Time Interval (TTI) and data rate.

Alternatively, each category can define the minimum data rate of the UE supported in predefined conditions.

According to a third embodiment, the data indicative of the receiver performance include a number of antennas of the user equipment.

The data indicative of the receiver performance can also include one of the following parameters:
  a distance between antennas,
  a coupling between antennas,
  a gain compared to a reference user equipment having only one antenna.

According to a fourth embodiment, the data indicative of the receiver performance include at least one of the following parameters:
  a type of receiver algorithm implemented in the user equipment,
  a gain compared to a reference receiver at a given Bit Error Rate (BER) and BLock Error Rate (BLER).

According to a fifth embodiment, the data indicative of the receiver performance include a Channel Quality Indicator (CQI) measured by the user equipment. This Channel Quality Indicator could indicate the transport format and hence the data rate supported by the UE under the currently measured radio conditions at a certain Bit Error Rate (BER) or BLock Error Rate (BLER). Under the same conditions UEs with different receiver performances would thus indicate different Channel Quality Indicators.

According to a sixth embodiment, the data indicative of the receiver performance include at least one of the following parameters:
  a parameter identifying the user equipment, such as a Medium Access Control (MAC) address, an International Mobile Equipment Identity (IMEI or IMEI-SV),
  a parameter indicative of the type of user equipment, such as a model of the user equipment.

The parameters provided in the different embodiment can be combined.

According to a fifth step, based on the data received at the second and third steps, the SRNC performs an admission control procedure. The SRNC estimates radio resources required to provide services (establish a radio bearer, a new flow or a radio link) to the user equipment in view of (as a function of) the receiver performance of the user equipment. Then the SRNC compares the estimated required resources with the available resources.

According to a sixth step, in case the SRNC and the CRNC are not collocated (i.e., are not located together), it is necessary that the SRNC indicates to the CRNC to establish the radio link or in the case the radio link is already established, to add a new radio bearer to the context of the user equipment.

The SRNC can also transmit data indicative of the receiver performance of the user equipment to the CRNC.

According to a seventh step, the CRNC performs an admission control procedure including the additional information that the CRNC has available. Based on the available measurements and data indicative of the receiver performance transmitted to the SRNC at the second and third steps, the SRNC estimates the necessary transmit power.

In case that the radio admission control is not successful the CRNC sends a failure message to the SRNC.

According to an eighth step, the CRNC indicates to the Node B to establish a radio bearer (RB), a radio link (RL) or a new flow depending on the service requested by the user equipment (UE).

The CRNC can also transmit data indicative of the receiver performance of the user equipment to the Node B.

According to a ninth step, the Node B performs an admission control procedure, taking into account the receiver performance of the user equipment.

According to a tenth step, in case the admission control is successful, the Node B indicates to the CRNC the successful establishment of the radio link (RL), radio bearer (RB) or new flow.

If the CRNC is not collocated with the SRNC, the CRNC indicates to the SRNC the successful establishment of a radio link (RL), a radio bearer (RB) or a new flow.

In case the admission control is not successful, the Node B sends a failure message to the CRNC.

If the CRNC is not collocated with the SRNC, the CRNC sends a failure message to the SRNC.

According to a twelfth step, if the admission control performed at the ninth step is successful, the SRNC allocates the necessary resources to the user equipment. The SRNC allocates a radio link (RL), a radio bearer (RB) a new flow to the user equipment for use.

If the admission control is not successful, the SRNC indicates to the Core Network or to the user Equipment that the new radio link, radio bearer or flow requested cannot be established.

According to a thirteenth step, the user equipment can use the radio link, the radio bearer allocated or the new flow allocated by the SRNC.

According to a fourteen step, the SRNC or the CRNC can initiate a release of lower priority user equipments or user equipments that require more power.

It will be noted that the admission control represented on FIG. 7 can comprise a preliminary step (represented in dotted line) during which the admission control entity transmits a message to the user equipment, said message defining a type of receiver performance data needed for the admission control.

Figure 8:
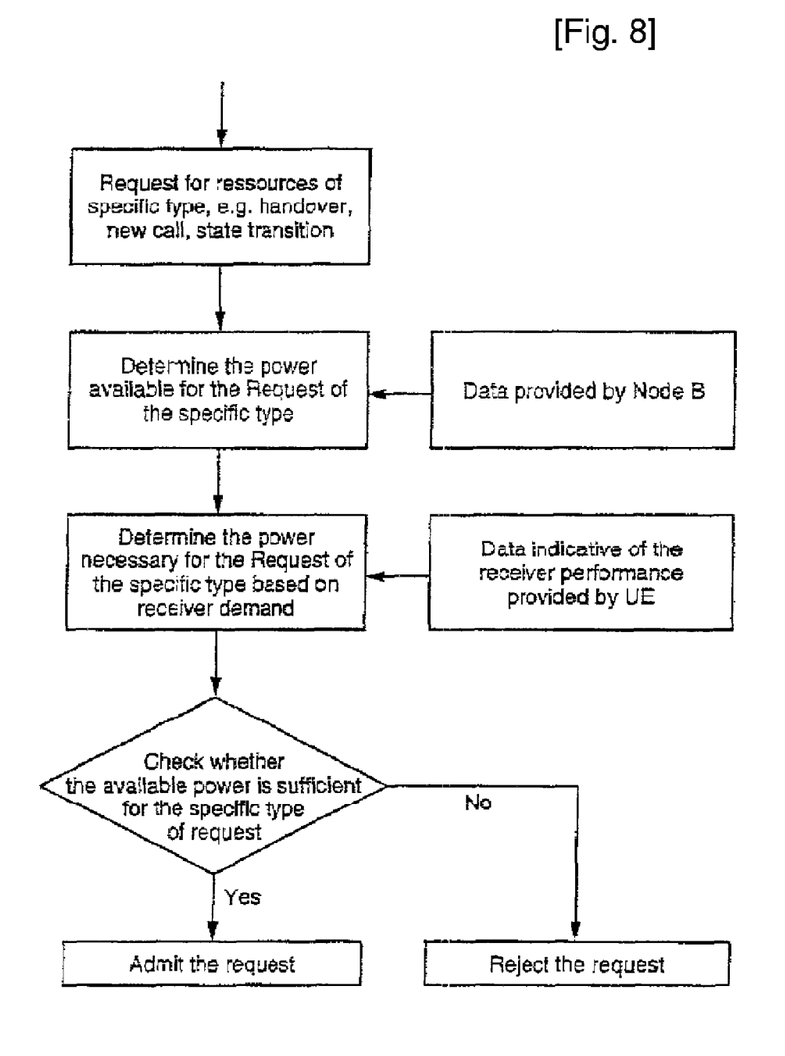
FIG. 8 is a flow chart representing an admission control algorithm performed by an admission control entity during an admission control procedure.

FIG. 8 represents an admission control algorithm performed by an admission control entity, such as the SRNC, the CRNC or the Node B, during an admission control procedure.

According to a first step, the admission control entity receives the service request message transmitted by the user equipment requesting a service that requires allocation of radio resources.

The request message can be a measurement control message (traffic measurement or measurements on the reception quality), a cell update message, an initial direct transfer message, a direct transfer message or an RRC connection request message or any other message that require that an admission control need to be performed.

According to a second step, the admission control entity receives data transmitted by a Node B of the cell.

The data provided by the Node B include data relative to the resources used in the cell. Such data include the Transmitted Carrier Power (TCP), Transmitted carrier power for all codes not used for High Speed Physical Downlink Shared CHannel (HS-PDSCH) or High Speed Shared CHannel Control CHannel (HS-SCCH) transmission, High Speed Downlink Shared CHannel (HS-DSCH) Required Power and High Speed Downlink Shared CHannel (HS-DSCH) Provided Bit Rate.

According to a third step, the admission control entity determines a resource available for the request according to the type of service requested, based on the data relative to the resources used in the cell transmitted by the Node B.

According to a fourth step, the admission control entity also receives data indicative of a receiver performance of the user equipment transmitted by the user equipment.

The admission control entity stores the data transmitted by the user equipment, so that the data can easily be forwarded from the admission control entity to another entity (for instance in case of change of SRNC) or be reused afterwards during another admission control procedure.

According to a fifth step, the admission control entity determines resources of the cell required to provide services to the user equipment in view of (as a function of) the receiver performance of the receiver equipment.

The resources of the cell required include an additional power required to set a new Dedicated CHannel (DCH) and the power required to set a new High Speed Downlink Shared CHannel (HS-DSCH).

For instance, the receiver performance can be coded as a relative power gain compared to a minimum predetermined requirement.

The control entity determines the resources of the cell required as follows.

The power required to set a new Dedicated CHannel (DCH):

$$\text{New\_Necessary\_DCH\_Power} = \frac{\text{target\_Ec/No} \cdot \text{CPICH\_Power}}{\text{CPICH\_Ec/No}} \cdot \text{reciever\_Perf}$$

where

New_Necessary_DCH_power is the additional power required to set a new DCH channel, Ec/No is a Received Energy per chip divided by the power density in the band for a given channel, CPICH_Ec/No is an Ec/No measured by the user equipment for the Common Pilot Indicator Channel (CPICH), CPICH_power is a transmit power of the Common Pilot Indicator Channel (CPICH) known to the entity performing radio admission control, Target_Ec/No is a predetermined target Ec/No based on the minimum receiver performance, and receiver_Perf is the receiver performance relative to the minimum receiver performance.

The power required to set a new High Speed Downlink Shared CHannel (HS-DSCH):

$$\text{New\_Necessary\_HS-DSCH\_Power} = \frac{(\text{target\_Ec/No} \cdot \text{CPICH\_Power} \cdot \text{factor\_for\_HS-DSCH} \cdot \text{factor\_for\_QoS})}{(\text{CPICH\_Ec/No})} \cdot \text{reciever\_Perf}$$

where

New_Necessary_HS-DSCH_power is the additional power required to set a new HS-DSCH, Ec/No is a Received Energy per chip divided by the power density for a given channel, CPICH_Ec/No is an Ec/No measured by the user equipment for the Common Pilot Indicator Channel (CPICH), CPICH_power is a transmit power of the Common Pilot Indicator Channel (CPICH) known to the entity performing radio admission, Target_Ec/No is a desired (or target) Ec/No based on the minimum receiver performance, factor_for_HS-DSCH is a factor giving the difference in terms of required transmission power between HS-DSCH compared to the DCH due for instance to scheduling and hybrid ARQ mechanisms, factor_for_QoS is a factor giving the difference in terms of required transmission power depending on the quality of services, for instance for services that require a different BLER or BER, and a different maximum delay compared to target_Ec/No, and receiver_Perf is the receiver performance relative to the minimum receiver performance.

Alternatively, the power required to set a new High Speed Downlink Shared CHannel (HS-DSCH) can take into account a Channel Quality Indicator (CQI) measured by the user equipment:

$$\text{New\_Necessary\_HS-DSCH\_Power} = \text{CPICH\_Power} \cdot \text{factor\_for\_QoS} \cdot \frac{\text{required\_data\_rate}}{\text{data\_rate}(CQI)} \cdot \Gamma \cdot \Lambda \cdot \text{factor\_desired\_Bler}$$

where

New_Necessary_HS-DSCH_power is the additional power required to set a new HS-DSCH, CPICH_power is a transmit power of the Common Pilot Indicator Channel (CPICH) known to the entity performing radio admission, factor_for_QoS is a factor giving the difference in terms of required transmission power depending on the quality of services, for instance for services that require a different Block Error Rate (BLER) or Bit Error Rate (BER), and a different maximum delay compared to target_Ec/No, required_data_rate is one of the attributes of the Quality of Service (QoS) that is received by the SRNC from the CN, data_rate (CQI) is the data rate which can be deduced from the Channel Quality Indicator (CQI), G is an offset value that the user equipment (UE) applies on the received power of the Common Pilot Indicator CHannel (CPICH) in order to determine the Channel Quality Indicator (CQI) value. The G value can be signalled from the network to the user equipment (UE) with dedicated signalling.

D is an offset value that the user equipment (UE) applies on the received power of the Common Pilot Indicator CHannel (CPICH) in order to determine the Channel Quality Indicator (CQI) value, and receiver_Perf is the receiver performance.

In order to allow the use of CQI to be reported when G and D have not been transmitted to the UE via dedicated signalling they could alternatively been sent on the system information.

It can be noted that CPICH_Ec/No, target Ec/No and receiver performance can be deduced from the Channel Quality Indicator (CQI), since the Channel Quality Indicator (CQI) indicates the transport format to be used for receiving a given Block Error Rate (BLER) which is typically set at 10% in the current standards.

According to a sixth step, the admission control entity determines whether the resources of the cell required to provide services to the user equipment are available.

If the resources are available, the admission control entity performs a sixth step.

According to the sixth step, the admission control entity admits the request from the user equipment.

If the resources are not available, the admission control entity performs a seventh step. According to the seventh step, the admission control entity rejects the request from the user equipment.

The present invention provides a method for performing admission control of a terminal, the method comprising: sending, to a network, information on at least one receiver performance of the terminal that is different from a minimum receiver performance, to allow the network to perform radio resource management; and receiving a service from the network that performed radio resource management.

The method further comprises: receiving configuration information from the network; and configuring a receiver of the terminal for reception of the service using the received configuration information. The minimum receiver performance refers to basic characteristics of the receiver of the terminal that are sufficient for reception of the service. The minimum receiver performance comprises at least one of an RRC connection request, a cell update, a measurement report, an initial direct transfer including received energy per chip divided by the power density in the band (Ec/No), pathloss, Received Signal Code Power (RSCP), and/or a Received Signal Strength Indicator (RSSI) of the Common Pilot Channel (CPICH) of current cells, neighboring cells or both. The information that is different from the minimum receiver performance comprises data related to signaling, receiver category, antennas used by the terminal, receiver algorithm, channel quality, and/or a unique identifier of the terminal. The data related to signaling is based on at least one of carrier interference, received energy, power density, power gain, error rate, number of bits, and/or data rate. The data related to receiver category is based on a given receiver performance value or range. The data related to antennas is based on at least one of a number of antennas, a distance between antennas, a coupling between antennas, and/or a gain value. The data related to receiver algorithm is based on a type of algorithm implemented in the terminal. The data related to channel quality is based on a Channel Quality Indicator (CQI). The data related to the unique identifier is based on a MAC address, an International Mobile Equipment Identity or a terminal model number.

Also, the present invention provides a method for performing admission control of a terminal located in a given cell of a cellular network, the method comprising: receiving, by an admission control entity of the network, information about a receiver performance of the terminal that is different from a minimum receiver performance; and performing radio resource management by determining radio resources required to provide at least one service to the terminal taking into account the received information.

The method further comprises: storing the received information on the receiver performance in the network. The radio resource management is related to at least one of radio admission control, call admission control, radio bearer set-up, and/or radio bearer reconfiguration. The radio resource management results in resource optimization. The information on receiver performance is included in a measurement control message indicating traffic management or measurements on reception quality, a cell update message, an initial direct transfer message, a direct transfer message or an RRC connection request message or any other message that requires admission control to be performed. The receiving step further comprises receiving receiver measurements comprising at least one of an RRC connection request, a cell update, a measurement report, an initial direct transfer including received energy per chip divided by the power density in the band (Ec/No), pathloss, Received Signal Code Power (RSCP), and/or a Received Signal Strength Indicator (RSSI) of the Common Pilot Channel (CPICH) of current cells, neighboring cells or both.

Additionally, the present invention provides a method for performing admission control of a terminal located in a cell of a cellular network, the method comprising: estimating a network load when the terminal is receiving a service; comparing the estimated network load with an available network capacity; and determining whether the terminal should be admitted or not according to the comparing, wherein at least one actual receiver performance of a terminal is used for estimating the network load.

The determining step further comprises: if the available network capacity is sufficient, admitting the terminal; or if the available network capacity is insufficient, rejecting the terminal or reducing a current network load in order to admit the terminal. The receiver performance is received from the terminal, was previously received in an earlier admission control procedure or received from another admission control entity. The method further comprises: using a minimum receiver performance related to a radio signal quality of a Common Pilot Channel (CPICH) of current cell, neighboring cells or both.

Furthermore, the present invention provides a method to allow a network to perform admission control for a terminal, the method comprising: sending, to the network, additional data related to receiver performance of the terminal that allows the network to estimate appropriate radio resources needed for the terminal; receiving configuration information from the network that performed appropriate radio resource allocation for the terminal using the sent additional data; and configuring a receiver of the terminal using the received configuration information to allow reception of a service provided from the network.

The method further comprises: sending basic data related to a radio signal quality of a Common Pilot Channel (CPICH) of current cell, neighboring cells or both.

The present invention provides a network that performs admission control of a mobile terminal located in a given cell of a cellular network, the network comprising: an admission control entity adapted to receive information about a receiver performance of the mobile terminal that is different from a minimum receiver performance; and the admission control entity further adapted to perform radio resource management by determining radio resources required to provide at least one service to the mobile terminal taking into account the received information.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method for performing admission control of a user equipment located in a cell of a cellular network, the method comprising:

receiving, at an admission control entity of the cellular network, receiver performance data sent from the user equipment, wherein the receiver performance data indicates a receiver performance of the user equipment and comprises at least one parameter required by the user equipment;

determining, at the admission control entity, cell resources required to provide services to the user equipment according to the receiver performance;

receiving, at the admission control entity, a request message from the user equipment with the receiver performance data of the defined type; and transmitting, by the admission control entity, a message to the user equipment, the message defining a type of the receiver performance data needed for the admission control, wherein the request message is a cell update message, a measurement report message or an initial direct transfer message, wherein the at least one parameter includes a first parameter comprising a Carrier Interference (C/I), a Received Energy per chip divided by a power density in a band of a pilot channel of the cell (Ec/No), or a Received Energy per bit divided by the power density in the band of the pilot channel of the cell (Eb/No), wherein the first parameter is configured to have a predetermined Block Error Rate (BLER), a number of bits per Transmission Time Interval (TTI) and a data rate, wherein the at least one parameter further includes at least a second parameter, a third parameter, or a fourth parameter, wherein the second parameter comprises a total number of antennas of the user equipment, a distance between the antennas, a coupling between the antennas, or a gain compared to a reference user equipment having only one antenna, wherein the third parameter comprises a receiver category that defines the receiver performance, a type of receiver algorithm implemented in the user equipment, or a gain compared to a reference receiver at a given Bit Error Rate (BER) and BLER, and wherein the fourth parameter comprises a Medium Access Control (MAC) address, an International Mobile Equipment Identity (IMEI), an International Mobile Equipment Identity and Software Version number (IMEI-SV), or a model of the user equipment.

2. The method of claim 1, further comprising:

determining, at the admission control entity, whether the cell resources are available; and allocating, at the admission control entity, the cell resources to the user equipment when the resources are available.

3. The method of claim 1, wherein the user equipment is initially in an idle mode and the user equipment transmits the receiver performance data to the admission control entity to establish a connection to the cell.

4. The method of claim 1, wherein the user equipment is initially in a connected mode in a first cell and the user equipment transmits the receiver performance data to the admission control entity to handover the connection to a second cell.

5. The method of claim 1, wherein the user equipment is initially in a connected mode in the cell and the user equipment transmits the receiver performance data to the admission control entity to carry out a state transition of the user equipment.

6. The method of claim 1, wherein the admission control entity is a node B, a Controlling Radio Network Controller (CRNC) or a Serving Radio Network Controller (SRNC) of a Universal Mobile Telecommunications System (UMTS) network.

7. The method of claim 1, further comprising determining, at the admission control entity, the receiver performance corresponding to a receiver category transmitted by the user equipment,
wherein the receiver category is included in the receiver performance data and defines the receiver performance.

8. The method of claim 1, wherein the receiver performance data further comprises a number of antennas of the user equipment, a distance between the antennas, a coupling between the antennas, and a gain compared to a reference user equipment comprising only one antenna.

9. The method of claim 1, wherein the at least one parameter is a type of receiver algorithm implemented in the user equipment, a gain compared to a reference receiver at a given Bit Error Rate (BER) and Block Error Rate (BLER), or a Channel Quality Indicator (CQI).

10. The method of claim 1 further comprising determining, at the admission control entity, the receiver performance corresponding to the at least one parameter,
wherein at least one of the at least one parameter is a first parameter identifying the user equipment or a second parameter indicating a type of the user equipment.

11. The method of claim 10, wherein:
the first parameter is a Medium Access Control (MAC) address, an International Mobile Equipment Identity (IMEI) or an International Mobile Equipment Identity and Software Version number (IMEI-SV), and
the second parameter is a model of the user equipment.

12. A cellular network for performing an admission control procedure, the cellular network comprising:
an admission control entity programmed to receive receiver performance data sent from a user equipment located in a cell of the cellular network, the receiver performance data defining a receiver performance of the user equipment and comprising at least one parameter required by the user equipment,
wherein the admission control entity is programmed to determine resources of the cell required to provide services to the user equipment according to the receiver performance,
wherein the admission control entity is configured to transmit a message to the user equipment, the message defining a type of the receiver performance data needed for the admission control,
wherein the admission control entity is configured to receive a request message from the user equipment with the receiver performance data of the defined type,
wherein the request message is a cell update message, a measurement report message, or an initial direct transfer message,
wherein the at least one parameter includes a first parameter comprising a Carrier Interference (C/I), a Received Energy per chip divided by a power density in a band of a pilot channel of the cell (Ec/No), or a Received Energy per bit divided by the power density in the band of the pilot channel of the cell (Eb/No),
wherein the first parameter is configured to have a predetermined Block Error Rate (BLER), a number of bits per Transmission Time Interval (TTI) and a data rate,
wherein the at least one parameter further includes at least a second parameter, a third parameter, or a fourth parameter,
wherein the second parameter comprises a total number of antennas of the user equipment, a distance between the antennas, a coupling between the antennas, or a gain compared to a reference user equipment having only one antenna,
wherein the third parameter comprises a receiver category that defines the receiver performance, a type of receiver algorithm implemented in the user equipment, or a gain compared to a reference receiver at a given Bit Error Rate (BER) and BLER, and
wherein the fourth parameter comprises a Medium Access Control (MAC) address, an International Mobile Equipment Identity (IMEI), an International Mobile Equipment Identity and Software Version number (IMEI-SV), or a model of the user equipment.

13. A method for performing admission control in a user equipment located in a cell of a cellular network, the method comprising:
sending a request message to an admission control entity of the cellular network with receiver performance data of the user equipment; and
receiving a message from the admission control entity, the message defining a type of the receiver performance data needed for the admission control,
wherein the receiver performance data of the defined type indicates a receiver performance of the user equipment and comprises at least one parameter set required by the user equipment,
wherein the request message is a cell update message, a measurement report message, or an initial direct transfer message,
wherein the at least one parameter set includes at least a first parameter set comprising a Carrier Interference (C/I), a Received Energy per chip divided by a power density in a band of a pilot channel of the cell (Ec/No), or a Received Energy per bit divided by the power density in the band of the pilot channel of the cell (Eb/No),
wherein the C/I, Ec/No, and the Eb/No are each configured to have a predetermined Block Rate Error (BLER), a number of bits per Transmission Time Interval (TTI), a data rate, and a Channel Quality Indicator (CQI),
wherein the at least one parameter set further includes at least a second parameter set, a third parameter set, or a fourth parameter set,
wherein the second parameter set comprises a total number of antennas of the user equipment, a distance between the antennas, a coupling between the antennas, or a gain compared to a reference user equipment having only one antenna, wherein the third parameter set comprises a receiver category that defines the receiver performance, a type of receiver algorithm implemented in the user equipment, or a gain compared to a reference receiver at a given Bit Error Rate (BER) and BLER, and wherein the fourth parameter set comprises a Medium Access Control (MAC) address, an International Mobile Equipment Identity (IMEI), an International Mobile Equipment Identity and Software Version number (IMEI-SV), or a model of the user equipment.

* * * * *